(12) United States Patent
Raj

(10) Patent No.: US 6,172,799 B1
(45) Date of Patent: Jan. 9, 2001

(54) THREE CHANNEL ACOUSTO-OPTICAL DEVICES

(75) Inventor: Kannan Raj, Chandler, AZ (US)

(73) Assignee: Intel Corporation, Santa Clara, CA (US)

(*) Notice: Under 35 U.S.C. 154(b), the term of this patent shall be extended for 0 days.

(21) Appl. No.: 09/345,073

(22) Filed: Jun. 30, 1999

(51) Int. Cl.[7] ........................................ G02F 1/33
(52) U.S. Cl. ..................... 359/305; 359/309; 359/310
(58) Field of Search ............................... 359/298, 303, 359/305, 309, 310, 314

(56) References Cited

U.S. PATENT DOCUMENTS 3,569,988  *  3/1971  Schmidt ........................... 359/303

* cited by examiner

*Primary Examiner*—Huy Mai
(74) *Attorney, Agent, or Firm*—Trop, Pruner & Hu, P.C.

(57) ABSTRACT

A three channel acousto-optic modulator may be used to implement a projection display or a scanner. Each of three channels are deflected differently by the modulator. The channels may correspond to the primary color planes.

23 Claims, 3 Drawing Sheets

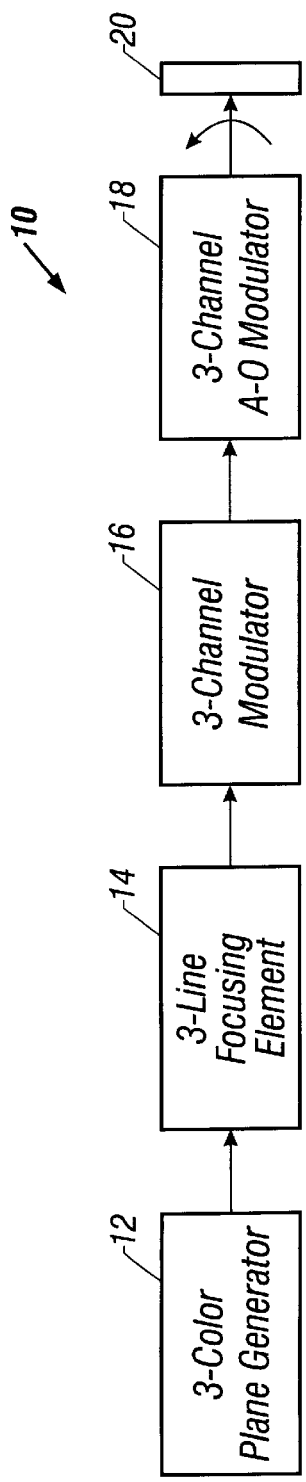
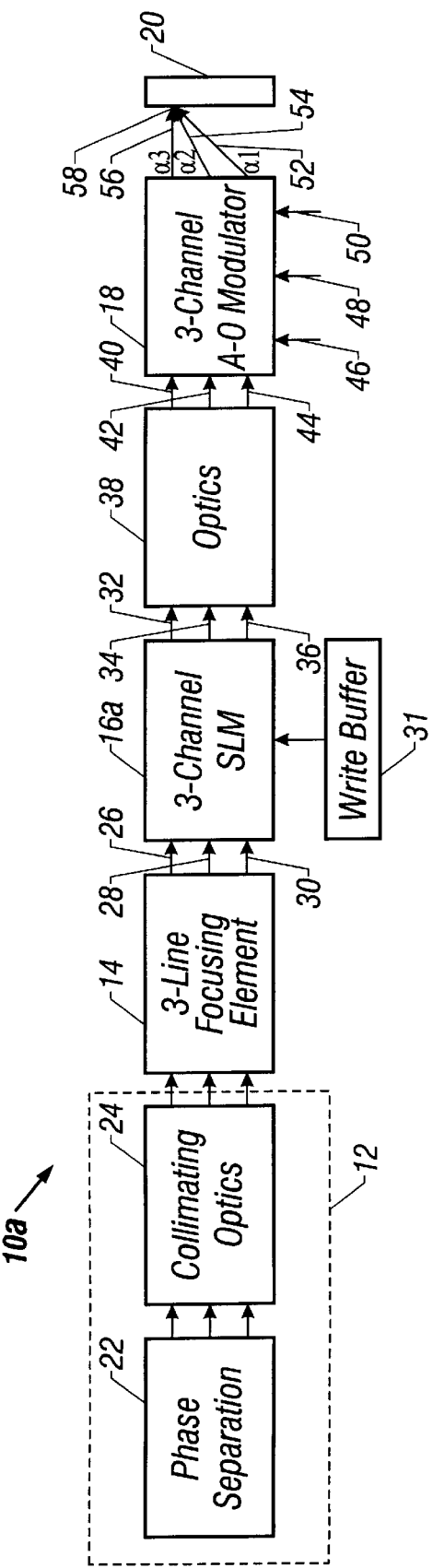

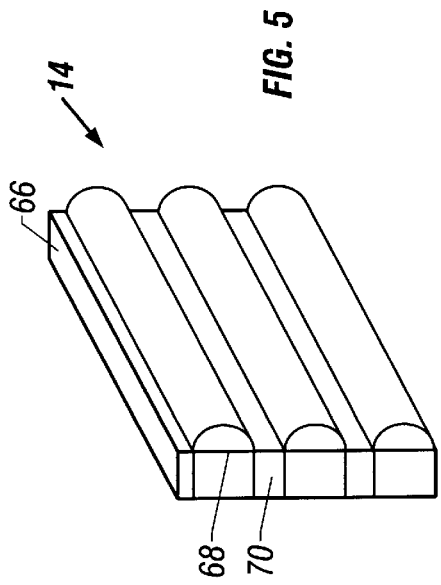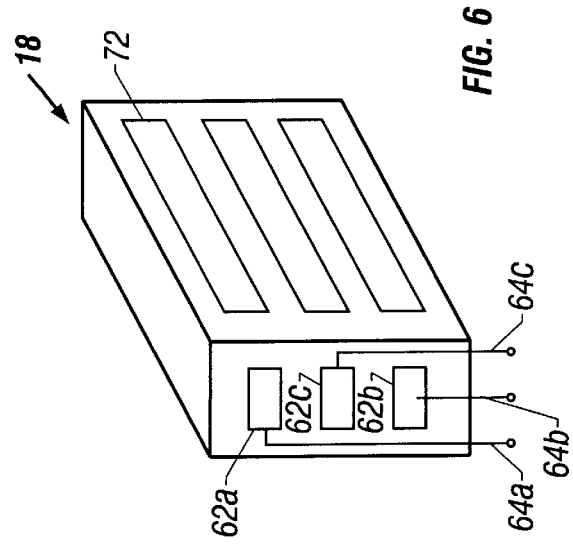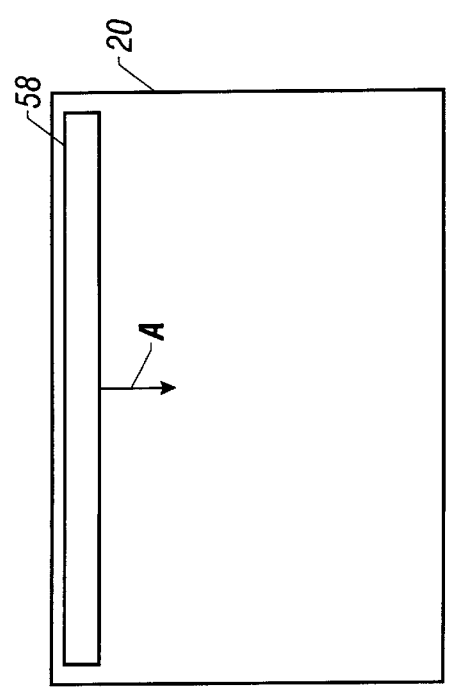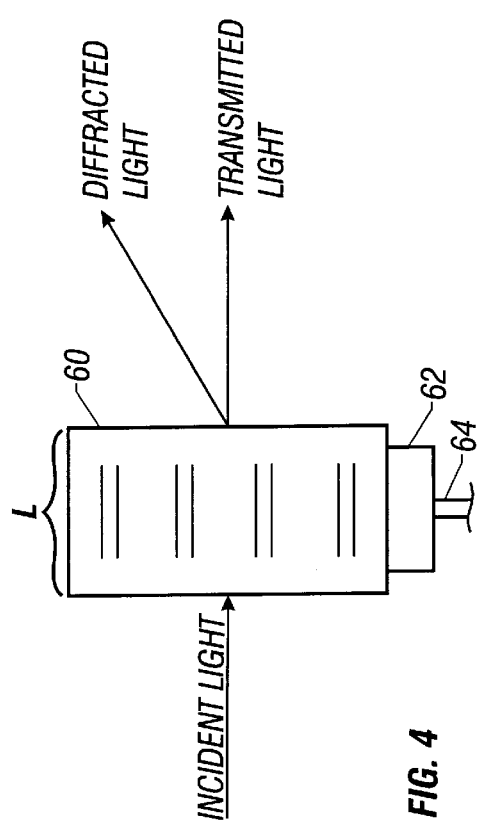

THREE CHANNEL ACOUSTO-OPTICAL DEVICES

BACKGROUND

This invention relates generally to optical devices such as projection displays and scanners using an acousto-optic light modulator.

It has been known for some time that light may be diffracted from periodic structures such as those created by sound. Acousto-optic devices have been used as modulators, scanners, spectrum analyzers, filters, frequency shifters and isolators.

An acousto-optic modulator includes an acoustic medium such as tellurium dioxide to which a piezoelectric transducer is bonded. An electric signal applied to the piezoelectric transducer is converted to sound waves propagating inside the acoustic medium. The frequency spectrum of the sound waves matches that of the electric excitation. The sound wave pressure pattern creates a travelling wave of rarefaction and compression which in turn causes an analogous perturbation of the refractive index of the acoustic medium.

The acousto-optic modulator may be thought of a phase grating with an effective grating line separation equal to the wavelength of the sound in the acoustic medium. A phase grating splits incident light into various orders. The angle between neighboring orders equals the ratio of the wavelength of the incident light inside the acoustic medium to the wavelength of sound in the acoustic medium and increases by a factor proportional to the refractive index of the medium.

In the process of interaction between phonons and photons there is conservation of energy and conservation of momentum. For a sufficiently wide acoustic transducer, only one diffracted order may be generated. There are prescribed angles of incidence and diffraction in the acoustic medium for plane waves of sound and light to interact such that the directions of incidence and scatter differ by an angle of twice the Bragg angle. This form of diffraction is called Bragg diffraction.

The sign of the Bragg angle is equal to the ratio of the wave number associated with the acoustic wave over twice the wave number of the optical wave. The wave numbers are equal to $2\pi$ divided by the wavelength of either the optical or acoustic wave. For any angle of incidence, the acoustic vector will complete an isosceles triangle defining the angle of diffraction. The highest efficiency is obtained when the tip of the vectors lie within a circle as described in the momentum matching diagram. The maximum diffraction efficiency is obtained at angles that satisfy the Bragg condition. The Bragg condition is satisfied by sufficiently wide transducers. The condition at which multiple diffraction orders are obtained is termed the Raman-Nath regime.

Previous acousto-optic displays have used a time sequenced or sequential operation. One row of data from either a transmissive or reflective spatial light modulator is imaged onto the acousto-optic modulator. The modulator deflects the line of data along the vertical dimension of the screen. A synchronously rotating color wheel or a synchronously switched liquid crystal color filter is used to provide time sequential scanning for multi-color displays. Thus, in a first instance of time data corresponding one color is passed through acousto-optic modulator and quickly thereafter data corresponding to the other two color planes are passed through the acousto-optic modulator in succession. If the timed sequence is fast enough, the user does not notice the sequencing effect.

Unfortunately, techniques which require timed sequential display result in relatively inefficient devices. Because only one wavelength of light is used at a time in a timed sequence, the majority of the incident light developed by the light source is wasted. Therefore, these devices have exhibited relatively poor light efficiency.

Thus, there is a continuing need for spatial light modulators using acousto-optic modulators which are capable of demonstrating improved efficiency.

SUMMARY

In accordance with one aspect, a method of deflecting light includes receiving a set of three lines of light, each line corresponding to a different color plane. A second set of three lines of light, each corresponding to a different color plane, is transmitted. Each of the lines of one of the sets is deflected by a different amount using a set of three acousto-optic modulators.

BRIEF DESCRIPTION OF THE DRAWINGS

FIG. 1 is a block depiction of one embodiment of the present invention applied to a projection display;

FIG. 2 is a more detailed block depiction of the embodiment shown in FIG. 1;

FIG. 3 is a schematic depiction of the scanning pattern on a screen in the embodiment shown in FIGS. 1 and 2;

FIG. 4 is a schematic view of one channel of an acousto-optic modulator in accordance with one embodiment of the invention;

FIG. 5 is a perspective view of one embodiment of a three line focusing element;

FIG. 6 is a perspective view of a three channel acousto-optic modulator in accordance with one embodiment of the invention;

DETAILED DESCRIPTION

Figure 7:
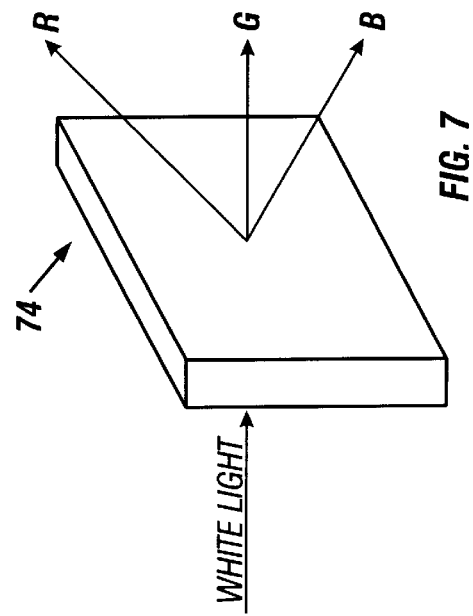
FIG. 7 is a perspective view of one embodiment of the three color plane generator shown in FIG. 1.

An optical device 10, shown in FIG. 1, is adapted to use a three channel acousto-optic modulator 18 to provide image information to the surface 20 in one embodiment of the present invention. Thus, in the case where the device 10 is a display, the surface 20 may be a display screen.

The acousto-optic modulator 18 has one channel for each of three color planes, such as the conventional red, green and blue (RGB) color planes. The image information received by the three channels of the acousto-optic modulator may be deflected so as to overlap on the display screen 20 to produce an image containing all three color planes.

In one embodiment of the present invention, the acousto-optic modulator receives a line of information for display onto a screen. Thus, as shown in FIG. 3, a pertinent line-like region of the surface 20 is involved. In a display embodiment, the image information may be displayed one line at the time progressively displaying the information in the direction of the arrow A.

While in some embodiments, a display that displays a line of information at a time is advantageous, in other embodiments of the present invention, a two dimensional array may be utilized instead of a simple line pattern. Thus, the array of acousto-optic modulator elements may be arranged in X and Y directions to provide an array of image or projection pixels, in one embodiment of the present invention.

Referring now to FIG. 1, a three color plane generator 12 may provide three collimated color planes of white light. Generally, the color plane generator using a white light source, separates and collimates the three color planes. A three line focusing element 14 receives each of the three color planes and focuses each color plane onto a separate channel of a three channel spatial light modulator 16. The modulator 16 in turn modulates each of the color planes independently and transmits the color planes to the three channel acousto-optic modulator 18. The modulator 16 provides a different angle of deflection for each channel, causing the three color planes to overlap on a line as shown in FIG. 3 on the display screen 20.

Referring to FIG. 2, the three color plane generator 12 may be implemented by a phase separation device 22 together with collimating optics 24. The collimating optics, in one embodiment of the present invention, may include a spherical lens. The phase separation device may be a conventional device which separates white light into the three color planes such as the red, green and blue color planes which are then collimated by the collimating optics 24. The color separation may be provided by a dispersive element such as a prism, a phase grating or a holographic optical element. The three primary color bands are then extracted.

The collimated color planes are then focused using a three line focusing element 14. In other words, each of the color planes is separately focused onto a different receiving channel of an appropriately positioned three channel spatial light modulator 16a. Each of the color planes 26, 28 and 30 may in fact be focused onto a different modulator channel.

The modulator is coupled to a write buffer 31 which writes the appropriate information onto each color plane. The modulated color planes 32, 34 and 36 are processed by imaging optics 38. In one embodiment of the present invention, the optics 38 may include a spherical lens. The resulting color planes 40, 42 and 44 are then received separately in each of three channels of a three channel acousto-optic modulator 18. The modulator deflects each of the color planes received in a different channel differently so that the three color planes 52, 54 and 56 overlap as indicated at 58 along a line on the surface 20 of FIG. 3. The acousto-optic modulator 18 deflects each channel by a different angle (alpha 1, alpha 2, alpha 3) to provide the desired color overlap, producing a three color line image on the surface 20.

The acousto-optic modulator may include a set of three channels 60, one of which is shown in FIG. 4, which are formed of an acousto-optic medium having a length L. The acousto-optic medium may be formed of tellurium dioxide in one embodiment of the present invention. A contact 62 is coupled to a signal source 64. In FIG. 2, three different signal sources 46, 48 and 50 are illustrated. Each of the signal sources are coupled to a different contact 62 and a different channel of the three channel acousto-optic modulator 18.

As indicated schematically in FIG. 4, a pattern of rarification and compression is achieved within the material 60 by applying a suitable radio frequency electrical signal. The signal is converted into a wave that is transmitted through the material forming the modulator 60. By making the length L sufficiently large, the acousto-optic modulator may be operated in the Bragg diffraction mode. Thus, the incident light, indicated by an arrow to the left in FIG. 4, is deflected, as indicated on the right in FIG. 4, through an angle which is determined by the signals applied to the acousto-optic modulator.

The three line focusing element 14 may be implemented, in one embodiment of the present invention, by a stack of three cylindrical lens elements 68 mounted in a rack 66, as shown in FIG. 5. Each of the elements 68 may be spaced by a spacer 70 so as to be vertically positioned at the right location to receive each of the color planes produced by the three color plane generator 12. Thus, in different systems, different spacers 70 may be utilized to appropriately space the cylindrical lenses 68 from one another.

Because of their cylindrical shape, light received from the generator 12 to the left in FIG. 2 is focused by the cylindrical side of the three line focusing element along a line which corresponds to one of the three channels of the spatial light modulator 16a. Again, the modulator 16a must be positioned at the appropriate focal point of the lenses 68 in an embodiment in which cylindrical lens are used as the three line focusing element 14.

In other embodiments, the element 14 may be replaced by a holographic device having the characteristics of three separate cylindrical focusing elements. In one embodiment of the present invention, three separate holographic plates may be spaced vertically in a stack to achieve this effect.

As shown in FIG. 6, the three channel acousto-optic modulator 18 may include a series of slots 72 which produce an appropriately deflected light beam of each of the three primary color planes. The deflection of the light is controlled by the transducers 62a–c which are coupled to the lines 64a, 64b and 64c which in turn may be coupled to the appropriate signals 46, 48 and 50 (FIG. 2). In this way, the color planes are deflected through the angles alpha 1, alpha 2 and alpha 3 to overlap on the screen 20.

Referring now to FIG. 7, the three color plane generator 12 may be formed by a holographic plate 74 which receives white light as indicated and produces the three color planes. The holographic plate 74 may be produced by imprinting a hologram, using the appropriate object and reference waves, to separate the primary color wavelength components. The hologram may provide the collimating effect as well by appropriately encoding the desired characteristics into the holographic plate 74. In some embodiments there are advantages to decreasing the number of elements since the optical efficiency is improved. One way to do this is to use holographic elements which provide multiple functions.

Each channel on the acousto-optic modulator is addressed with a voltage (46, 48, 50) whose frequency is based on a line number of the input data. The frequency for each channel is also dependent on the optical diffraction angle necessary to focus each color on the same location on the projection screen.

The embodiment shown in FIGS. 1 and 2 may have as much as three times the light utilization efficiency as a device which uses time sequential display with a single channel acousto-optic modulator. Since the optical path has three imaging lenses along the way, the effective light collection is conserved as a light beam gets converted from a point source to three line surfaces and three images at the output. Because only one of three wavelengths is utilized at any time in a sequential system, the remaining light of the other primary color wavelengths is effectively lost. Thus, the intensity may be three times greater than using the single channel acousto-optic modulator due to spatial multiplexing. For a given frame update rate, the pixel data rate is three times that of a single channel architecture.

Since some embodiments of the present invention do not require storage elements, a multiplexer structure may be used to route the color intensity data to the respective light modulators. In addition, perceptual artifacts due to time division multiplexing color, such as image break-up during visual saccades, are eliminated in some embodiments of the present invention.

The spatial light modulator may be utilized in a transmissive or reflective mode. By using the three channels of N pixels rather than $N^2$ pixels for a two dimensional array, silicon area usage can be decreased in some embodiments of the present invention. While a three color plane generator is illustrated, in some embodiments of the present invention, three individual light sources may be utilized instead.

In some embodiments, using a three cylinder focusing element raises essentially no alignment issues. The device can be made reasonably compactly.

Figure 8:
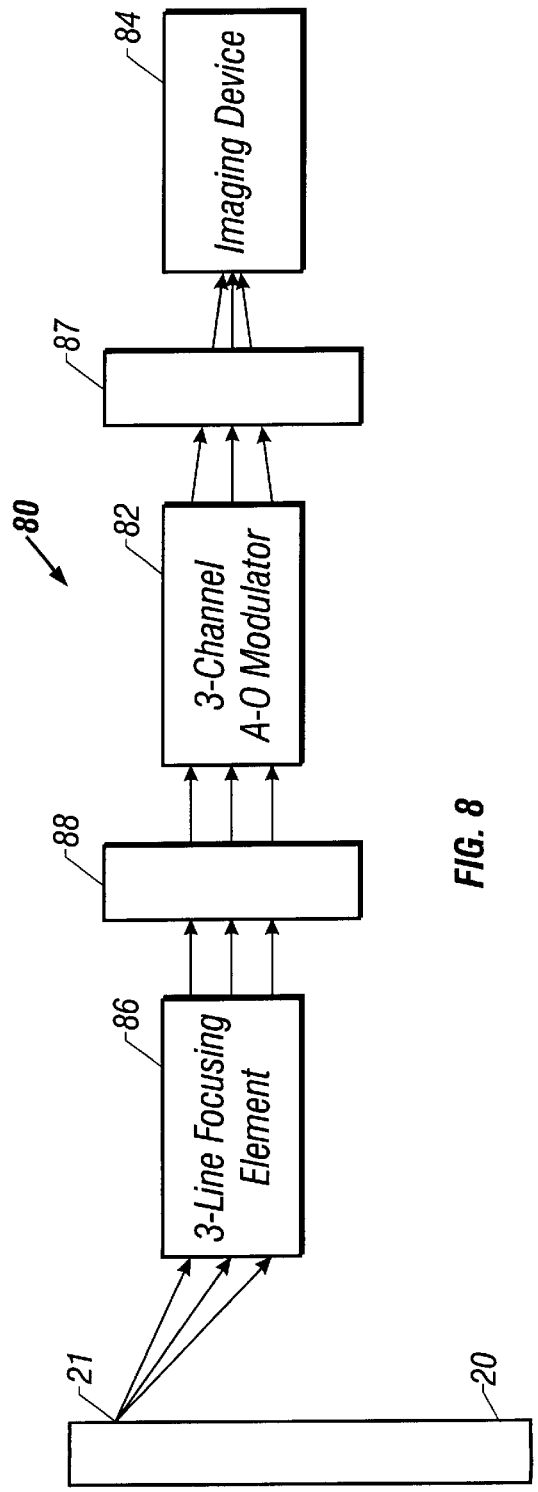
FIG. 8 is a block depiction of a scanner in accordance with one embodiment of the present invention.

Referring now to FIG. 8, a scanner 80 uses the three line focusing element 86 to progressively scan an object 20. The acousto-optic modulator 82 provides different angular deflections of three primary color incident light channels onto an imaging device 84.

Figure 9:
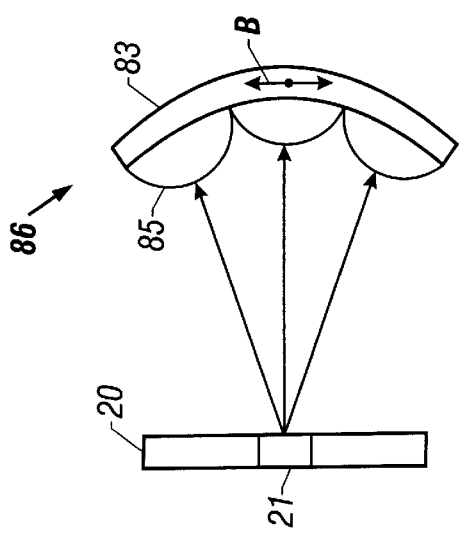
FIG. 9 is a schematic depiction of a three-element focusing device useful in one embodiment of a scanner in accordance with the present invention.

The three line focusing element 86, shown in FIG. 9, images a given line 21 on the surface 20. The focusing element 86 forms three light channels that are transmitted by a color filter array (CFA) 88. The focusing element 86 may include three cylindrical lenses 85 mounted on a curved rack 83. Thus, all three lenses 85 image the same line 21 on the object 20. The CFA 88 passes light of a different primary color wavelength to each channel of acousto-optic modulator 82. The CFA 88 may be situated in the path of the light incident to each channel of the modulator 82.

The light beams, each of a different primary color wavelength, received by the three channel acousto-optic modulator 82, are deflected to overlap along a line of the image sensor 84. In one embodiment of the present invention, the imaging sensor 84 may be a digital photosensitive array such as a complementary metal oxide semiconductor (CMOS) array or a charge coupled device (CCD) array. The optical element 87 may be a spherical lens. In other embodiments, the optical element 87 may include a holographic element acting as a spherical lens.

Thus, the scanner scans an object three color lines at a time. By rotating the rack 83 in the direction of the arrows B in FIG. 9, the entire object 20 is progressively imaged.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of deflecting light comprising:
   receiving a first set of three lines of light, each line of light corresponding to a different color plane;
   receiving a second set of three lines of light, each line of light corresponding to a different color plane; and
   reflecting each of the lines of light of one of said sets by a different amount using a three channel acousto-optic modulator.

2. The method of claim 1 including capturing an image of each of said second set of lines of light.

3. The method of claim 1 including the method of projecting each of said second set of lines of light onto a projection screen.

4. The method of claim 1 further including receiving a light from a point source of light, creating three separately focused lines of light, and transmitting said three separately focused lines of light to said acousto-optic modulator.

5. The method of claim 4 wherein creating three separately focused lines of light includes using a set of three cylindrical lenses.

6. The method of claim 3 including progressively scanning lines of light over a projection screen.

7. The method of claim 2 including progressively imaging a plurality of lines of an object to be imaged.

8. An electro-optic device comprising:
   a focusing element adapted to receive a point source of light and to form three light channels each focused at a different focal point; and
   an acousto-optic modulator having three channels coupled to one of said channels of said three light channels, said acousto-optic modulator deflecting each channel through a different angle.

9. The display of claim 8 wherein said focusing element is an array of three cylindrical lenses each having a different focal point.

10. The display of claim 9 wherein each of said cylindrical lenses has a linear focal point.

11. The display of claim 8 further including a projection screen and a three channel spatial light modulator coupled between said focusing element and said acousto-optic modulation, said modulator adapted to produce three overlapping images each of a different primary color on said screen.

12. The display of claim 8 wherein said focusing element is formed by a holographic plate, said plate providing both diffusion and lenticular spreading.

13. The display of claim 8 wherein said acousto-optic modulator satisfies the Bragg condition.

14. The electro-optic device of claim 8 wherein said device is a scanner.

15. The electro-optic device of claim 8 wherein said device is a projection display.

16. An electro-optic projection display comprising:
   a focusing element adapted to receive a point source of light and to form three light channels each focused at a different focal point;
   a spatial light modulator having three channels, each channel adapted to receive one of said light channels from said focusing element; and
   an acousto-optic modulator having three channels coupled to one of said channels of said spatial light modulator, each channel deflecting light by a different amount.

17. The display of claim 16 wherein said focusing element is an array of three cylindrical lenses each having a different focal point.

18. The display of claim 17 wherein each of said cylindrical lenses has a linear focal point.

19. The display of claim 16 further including a projection screen, said modulator adapted to produce three overlapping images each of a different primary color on said screen.

20. A scanner comprising:
   a focusing element adapted to form three light channels, each channel conveying information about the same object and each channel corresponding to a different primary color plane;
   an acousto-optic modulator having three channels, each coupled to one of said channels from said element, each modulator channel deflecting light by a different amount; and
   an imaging device adapted to receive said three channels from said modulator.

21. The scanner of claim 20 wherein said focusing element is adapted to be displaced to progressively scan the object.

22. The scanner of claim 21 wherein said modulator is adapted to cause said channels to overlap at said imaging device.

23. The scanner of claim 20 wherein said focusing element includes a device adapted to separate, for each channel, a primary color wavelength from white light.

* * * * *